UNITED STATES PATENT OFFICE.

PETER J. KELLY, OF NEW YORK, N. Y., ASSIGNOR TO ELIZABETH THOMPSON, OF SAME PLACE.

IMPROVEMENT IN RUBBER COMPOUNDS FOR BEARINGS, &c.

Specification forming part of Letters Patent No. 116,322, dated June 27, 1871; antedated May 29, 1871.

*To all whom it may concern:*

Be it known that I, PETER J. KELLY, of the city of New York, in the county and State of New York, have invented a new and Improved Rubber Compound; and I do hereby declare that the following is a full, clear, and exact description thereof, which will enable others skilled in the art to make and use the same:

The principle of my invention consists in forming an anti-friction surface on an elastic and non-heat-conducting substance, for use as bearings and for other analogous purposes. In order to combine these principles of smoothness, elasticity, and non-conductivity—the first to remove all unnecessary friction, the second to take up the shock and jar of machinery, and the third to remove the tendency to heat—I employ the following instrumentalities:

I take any soft metal, as plumbago, zinc, or lead, powder it finely, and mix it thoroughly with semi-liquid India rubber. The mixture is afterward brought into any required form by molding or rolling, when it is afterward vulcanized. It is thus admirably adapted for packing or bearings and kindred objects. The metal may be employed in any proportion, as the effect will be the same in kind but different in degree.

Having thus described all that is necessary to a full understanding of my invention, what I esteem to be new, and desire to protect by Letters Patent, is—

A composition, formed of India rubber and a soft metal finely powdered, and applied in a molded or rolled form, for bearings, packing, and analogous purposes.

PETER J. KELLY.

Witnesses:
GEO. W. MABEE,
T. B. MOSHER.